(12) United States Patent
Dehnen

(10) Patent No.: US 10,227,974 B2
(45) Date of Patent: Mar. 12, 2019

(54) PRESSURE MONITORING APPARATUS

(71) Applicant: Andreas Hofer Hochdrucktechnik GmbH, Mülheim an der Ruhr (DE)

(72) Inventor: Manfred Dehnen, Essen (DE)

(73) Assignee: ANDREAS HOFER HOCHDRUCKTECHNIK GMBH, Mulheim an der Ruhr (DE)

( * ) Notice: Subject to any disclaimer, the term of this patent is extended or adjusted under 35 U.S.C. 154(b) by 107 days.

(21) Appl. No.: 15/610,715

(22) Filed: Jun. 1, 2017

(65) Prior Publication Data
US 2017/0350387 A1 Dec. 7, 2017

(30) Foreign Application Priority Data

Jun. 1, 2016 (DE) .......................... 10 2016 110 136

(51) Int. Cl.
| | |
|---|---|
| *F04B 43/067* | (2006.01) |
| *F04B 45/053* | (2006.01) |
| *F04B 49/22* | (2006.01) |
| *F04B 51/00* | (2006.01) |
| *F04B 45/04* | (2006.01) |
| *G01L 19/00* | (2006.01) |

(Continued)

(52) U.S. Cl.
CPC .............. *F04B 51/00* (2013.01); *F04B 39/04* (2013.01); *F04B 43/0081* (2013.01); *F04B 43/067* (2013.01); *F04B 45/04* (2013.01); *F04B 45/0533* (2013.01); *F04B 45/0536* (2013.01); *F04B 49/22* (2013.01); *G01L 19/0007* (2013.01); *G01L 19/086* (2013.01); *F04B 2201/0401* (2013.01); *F04B 2205/03* (2013.01)

(58) Field of Classification Search
CPC ...... F04B 39/04; F04B 43/00; F04B 43/0081; F04B 43/02; F04B 43/06; F04B 43/067; F04B 45/00; F04B 45/04; F04B 45/053; F04B 45/0533; F04B 45/0536; F04B 49/00; F04B 49/22; F04B 51/00; F04B 2201/0401; F04B 2205/03; G01L 19/0007; G01L 19/086
See application file for complete search history.

(56) References Cited

U.S. PATENT DOCUMENTS

| | | | |
|---|---|---|---|
| 6,767,189 B2 | 7/2004 | Kleibrink | |
| 2013/0004340 A1* | 1/2013 | Gonnella | ................ F04B 13/00 |
| | | | 417/53 |
| 2014/0109763 A1* | 4/2014 | Reed | ....................... F04B 15/02 |
| | | | 92/48 |

* cited by examiner

Primary Examiner — Nguyen Q. Ha
(74) Attorney, Agent, or Firm — David S. Safran; Roberts Mlotkowski Safran Cole & Calderon, P.C.

(57) ABSTRACT

A pressure monitoring apparatus for a membrane compressor, with at least one pressure transducer for recording the pressure within a certain volume, with at least one nonreturn valve and with at least one shutoff valve, for blocking of the nonreturn valve, the shutoff valve and the nonreturn valve each being located in a flow path through which a medium can flow between the volume and the pressure transducer. A pressure monitoring unit delivers exact measured values and which can be economically implemented is achieved by there being at least two nonreturn valves which are located anti-parallel in respective flow paths, the first nonreturn valve blocking in the flow direction from the volume to the pressure transducer and the second nonreturn valve blocking in the flow direction from the pressure transducer to the volume, and by there being at least two shutoff valves for blocking a respective flow path.

12 Claims, 5 Drawing Sheets

(51) Int. Cl.
*G01L 19/08* (2006.01)
*F04B 39/04* (2006.01)
*F04B 43/00* (2006.01)

PRESSURE MONITORING APPARATUS

BACKGROUND OF THE INVENTION

Field of the Invention

The invention relates to a pressure monitoring apparatus, in particular for a compressor, with at least one pressure transducer for recording the pressure within a certain volume, with at least one nonreturn valve and with at least one shutoff valve for blocking of the nonreturn valve, the shutoff valve and the nonreturn valve each being located in a flow path through which a medium can flow between the volume being monitored and the pressure transducer.

Description of Related Art

Pressure monitoring apparatus are known from the prior art and are often used. In many, technical domains for example pure gases are required which are sold as a product or are used in industrial installations for other purposes. Such technical gases, for example cooling gases, are routed in a continuous circuit in order on the one hand to enable economical operation of an industrial installation and on the other to make the gases available at the decisive points in the process. To enable transport of the gases or liquids, they are generally conveyed using compressors or pumps. In doing so in particular gases can be contaminated by lubricants or other substances. In order to reduce contamination, generally membrane compressors or membrane pumps are therefore used to convey these gases.

Membrane compressors work similarly to piston compressors, but with a separating membrane between the gas side and the oil side. On the gas side there are gas intake and pressure valves. On the oil side there are cylinders and pistons, as in a piston compressor. When the piston is retracted, it displaces a certain volume in the oil space. The resulting pressure rise acts on the membrane which is being deflected. The deflection of the membrane in the direction of the gas side in turn compresses the gas on the gas side and the gas is expelled by the pressure valves. When the piston is being extended a reverse process is triggered. Due to the oil pressure which drops when the piston is being lowered in the direction of the piston, therefore in the direction of the oil side, the membrane is deflected, as a result of which the gas expands on the gas side and further gas is intaken by the gas intake valves.

Membrane compressors are in any case more sensitive than piston compressors since the so-called leakage of the piston must be compensated by continuous injection of oil via a secondary oil circuit. The exact amount of leakage can be determined, if at all, only at a disproportionate high cost. Still the amount of oil on the oil side must be so great that the oil pressure at top dead center of the piston is always greater than the pressure on the gas side in this state. If this is not the case, unperturbed operation of the membrane compressor cannot be ensured. In the worst case the membrane or the compressor can be damaged.

For this reason various oil pressure monitoring systems or oil pressure measurement methods have been developed. A process is known from practice in which a pressure transmitter is located on the oil side of a membrane compressor, the pressure transmitter being connected to a programmable control (SPS). When the pressure is acquired it is important that the pressure which has been reached at maximum for one piston stroke is recorded since the latter is decisive for the correct manner of operation of the compressor. Since the time which one piston stroke requires is very short, for example only roughly 200-300 ms, the control must be able to process the pressure currently acquired from the pressure transmitter within very short time intervals of a few ms. Consequently in the process known from the prior art the disadvantage is that a high-speed pressure transmitter and a very fast SPS must be used; this is reflected in a high cost for this system.

Moreover, German Patent DE 101 38 674 B4 and corresponding U.S. Pat. No. 6,767,189 B2 shows a process for avoiding damage cases of membrane compressors in which both on the oil side of the membrane head and also in the gas pressure line on the gas exit side of the membrane head there are electronic pressure transducers. The pressure transducers are connected to an electronic evaluation system, the signals of the two electronic pressure transducers being brought into a relation to one another. When a certain minimum relation is not reached, signalling is induced to avoid a possible damage case. In this process prompt evaluation of the signals is necessary in order to determine the maximum pressure caused by the piston stroke within the discrete time intervals in which the measurement is being taken.

SUMMARY OF THE INVENTION

The object of this invention is therefore to devise a pressure monitoring apparatus and a process for operation of a compressor with a pressure monitoring apparatus which delivers exact measured values and which can be still economically implemented.

The object is achieved in the pressure monitoring apparatus in accordance with the invention in that there are at least two nonreturn valves each of which is located antiparallel in a respective flow path, one nonreturn valve blocking in the flow direction from the volume to the pressure transducer and the other nonreturn valve blocking in the flow direction from the pressure transducer to the volume. Moreover, there are at least two shutoff valves, each of which blocking a respective one of the flow paths. The arrangement of the nonreturn and shutoff valves in accordance with the invention makes it possible to alternatively acquire the maximum generated pressure of one piston stroke or the minimum pressure. Both the oil pressure and the gas pressure rise when the piston is retracted into the oil space. The pressure transducer is located preferably on the oil side, in particular for a membrane compressor. In a piston compressor, however, an arrangement of the pressure transducer on the gas side is also possible and effective, as a result of which the compressor valves can be monitored. A measurement with two pressure transducers, one at a time both on the gas and also on the oil side is likewise conceivable, but not necessary.

The pressure transducer thus acquires the maximum pressure because the nonreturn valve blocks in the flow direction from the pressure transducer to the volume. This means the nonreturn valve is opened as long as the pressure in the volume is higher than the pressure downstream of the nonreturn valve in the first flow path. With the shutoff valve opened in this flow path, consequently also the pressure in the flow path rises when the pressure rises in the monitored volume. Here, the shutoff valve in the second flow path is closed. When the pressure drops again due to the oscillating movement of the piston, the pressure in the flow path downstream of the shutoff valve is higher than in the volume. The shutoff valve thus automatically blocks the flow path between the volume and the pressure transducer due to the pressure difference. The second flow path is closed by the second shutoff valve. In this way the pressure transducer records only the maximum pressure and changes the value only when the pressure in the monitored volume, for example, the oil space, becomes greater than the value which was measured last.

In order to be able to take another measurement of the maximum pressure without the maximum pressure which was acquired last by the pressure transducer having to be exceeded, the flow path for measuring the maximum pressure must be blocked with the assigned shutoff valve, the shutoff valve of the other flow path being opened. If the pressure in the opened other flow path upstream of the shutoff valve on the side of the pressure transducer is higher than the pressure in the volume, the second shutoff valve of the second flow path which is located anti-parallel to the shutoff valve in the first flow path opens so that pressure equalization takes place. The pressure which has been measured by the pressure transducer drops in doing so until the minimum pressure of the piston stroke is reached. In this way the minimum pressure in the volume is thus measured. When the pressure rises again in the volume, the nonreturn valve of the second flow path blocks this second flow path. Furthermore the shutoff valve in the first flow path is opened again and the shutoff valve in the second flow path is closed so that again the maximum pressure in the volume is being measured. In this way, consequently the flow paths are alternately relieved and pressurized, and both the maximum and also the minimum pressure can be acquired.

One advantage of this invention is that a high-speed and thus expensive SPS and a high-speed pressure transducer can be omitted since it is not necessary to take a prompt continuous measurement, but rather either the maximum and ultimately also relevant pressure or the minimum pressure is determined. Even for very short time intervals of a few hundred ms, in which one piston stroke is executed, there is thus no danger of missing the maximum pressure caused by one piston stroke.

The arrangement of the shutoff valves in the respective flow paths can be made differently. In one configuration of the pressure monitoring apparatus, it is provided that the shutoff valves are each located in the flow direction from the volume to the pressure transducer upstream of the assigned nonreturn valve. In another configuration, it is conversely provided that the shutoff valves are each located in the flow direction from the volume to the pressure transducer downstream of the assigned nonreturn valve. It would also be conceivable for one shutoff valve to be located upstream of a nonreturn valve while the other shutoff valve is located downstream of the other nonreturn valve. The shutoff valves need simply be suitable for blocking of the flow path from the volume to the pressure receiver or from the pressure receiver to the volume.

It is advantageously provided that the shutoff valves are implemented by a 3/2 way valve. The 3/2 way valve simplifies the switching possibilities of the flow path. In this way, it is possible to automatically block only the first flow path or only the second flow path. Appropriately, at least one flow path at a time is consequently opened so that measurements can be taken. The option of opening two flow paths would lead to the pressure transducer continuously receiving signals, since both a pressure increase, and also a pressure reduction are possible when the two flow paths are opened. Moreover, the use of a 3/2 way valve also leads to the pressure monitoring apparatus being able to have altogether a relatively small installation volume.

For easier operation of the pressure monitoring apparatus, there is a pressure display apparatus which displays the values which have been measured by the pressure transducer. The pressure display apparatus can preferably be a visual indication, for example, a display, so that the current pressure value can be promptly and easily read off on site. In addition, however, an acoustic indication is possible with which in addition a warning signal is delivered when a boundary value is reached.

Another advantageous configuration of the invention calls for there to be a programmable control for control and/or adjustment of the pressure monitoring apparatus. In this way, the shutoff valves or the 3/2 way valve can be automatically opened and blocked and other actions for predetermined events can be programmed. The SPS need not have an especially short processing time since a measurement of the maximum and of the minimum pressure at an interval of a few seconds is generally sufficient.

The initially named object in a process for operating a compressor with a pressure monitoring apparatus in accordance with the invention is achieved in that the shutoff valves are activated in defined intervals, one shutoff valve at a time being opened and the other shutoff valve being blocked so that in the flow direction from the volume to the pressure transducer the maximum pressure in the volume and in the flow direction from the pressure transducer to the volume the minimum pressure are acquired by the pressure transducer. The maximum and the minimum pressure can be measured in almost any time intervals and the measurement is in particular independent of the time which one piston stroke requires. Within this time which is generally only a few 100 ms, the pressure passes through both a maximum and also a minimum. The measurements of the maximum and minimum pressure can however be taken at much longer intervals of for example some few seconds. Longer time intervals are also conceivable to save resources.

In order to enable economical operation of piston and membrane compressors, characteristics are generally recorded from compressors and also from pumps, which characteristics yield a relationship between physical quantities which are relevant to operation, such as for example the delivery amount and the pressure. One compressor operates ideally in the region of the respective characteristic, i.e. at a certain delivery amount with the optimum pressure provided for this purpose. If the pressure deviates too dramatically from the ideal value, this can be due to a fault or damage of the compressor. According to one configuration of the process it is therefore provided that when a respectively defined boundary value of the maximum pressure is exceeded or undershot an optical and/or acoustic signal is output. The acoustic signal can be implemented for example by a warning tone. Signal lamps are also possible for an optical warning. A display is likewise conceivable on which fault reports can be output. Furthermore, relaying and processing of the measured signals in a process control system are possible.

Another configuration of the invention calls for an optical and/or acoustic signal to be output when a respectively defined boundary value of the minimum pressure is exceeded or undershot. Exactly as in the warning of the maximum pressure being exceeded or undershot a warning for the minimum pressure being exceeded or undershot can also be output. The warnings can be the same or can differ from one another so that a user directly recognizes which type of fault is present.

One possible change in current operation of the compressor can also already be recognized before a boundary value is exceeded or undershot. For this purpose, in another configuration of the process it is provided that the characteristic of the acquired values of the maximum pressure and/or the characteristic of the acquired values of the minimum pressure is determined. By observing the characteristic of the respective pressures, therefore of the maximum pressure and/or the minimum pressure, a trend of the pressure characteristic can be recognized. If the maximum pressure, for example, rises too dramatically with time or the minimum pressure drops too dramatically with time, corresponding countermeasures can be taken by a technician. A continuous drop of the oil pressure is generally a sign of wear of the compressor components, in particular of the oil overflow valve or of the compensation pump. A rapid drop of the oil pressure can in turn be a sign of an operating problem or a defect. When faulty behavior is recognized by the trend recognition, the compressor can thus be already ramped down in good time, and in this way, if necessary, a serious defect or destruction of a part can be prevented.

In order to increase the accuracy of the measurements and in particular of the trend recognition, in one advantageous configuration of the process as claimed in the invention it is provided that in a deviation of the given pressure characteristics of the maximum pressure and/or of the minimum pressure the defined intervals in which the shutoff valves are each opened and blocked are adjusted. Stipulated pressure characteristics are defined as an ideal characteristic of the pressure. When a compressor is started up the pressure is first built up gradually until the desired pressure is reached. The maximum oil pressure rises dramatically during the start-up of a membrane compressor, while the pressure peak and pressure minimum in current operation should not fluctuate too much. If the pressure minimum and/or the pressure maximum rises or falls too dramatically with time, this can be due to a fault in the operating installation or a compressor fault. In this case it can be a good idea to shorten the interval of the measurements in order to be able to react more quickly to critical pressure values being reached. A technician can conclude from this that there is a fault in the installation or on the compressor. He can thus react before damage to the compressor or the entire installation occurs.

In particular, there is a host of possibilities for configuring and developing the pressure monitoring apparatus and the process in accordance with the invention for operation of a membrane compressor. For this purpose reference is made to the following description of exemplary embodiments in conjunction with the accompanying drawings.

DETAILED DESCRIPTION OF THE INVENTION

Figure 1:
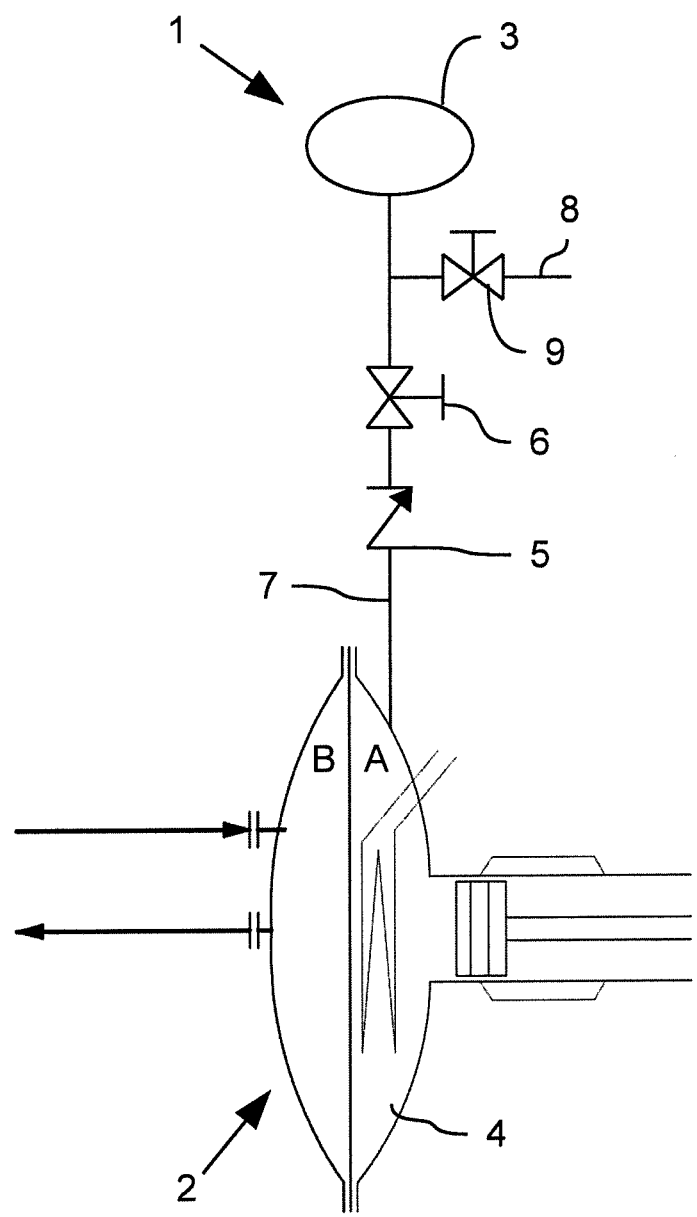
FIG. 1 shows a schematic of a pressure monitoring apparatus known from the prior art.

FIG. 1 is a schematic representation of a pressure monitoring apparatus 1 known from the prior art. The illustrated pressure monitoring apparatus 1 can be used to monitor the pressure in a membrane compressor 2 with an oil side A and a gas side B separated by a membrane. For this purpose, there is a pressure transducer 3 which measures the pressure in the volume 4 on the oil side A of the membrane compressor 2. Between the volume 4 and the pressure transducer 3, there are a nonreturn valve 5 and a shutoff valve 6 in the flow path 7 from the volume 4 to the pressure transducer 3. Downstream of the shutoff valve 6 in the direction toward the pressure transducer 3 is a branch 8 in which there is another shutoff valve 9.

The nonreturn valve 5 blocks flow in the direction from the pressure transducer 3 to the volume 4, i.e., the nonreturn valve 5 opens in the direction from the volume 4 to the pressure transducer 3. As long as the pressure in the volume 4 is greater than the pressure in the flow path 7 downstream of the nonreturn valve 5, a medium which is flowing through the flow path 7 can flow from the volume 4 to the pressure transducer 3. This increases the pressure in the flow path 7 and thus also the pressure which is measured by the pressure transducer 3. The pressure transducer 3 thus does not continuously measure the pressure characteristic which prevails in the volume and which arises due to the oscillating movement of the piston, but only the maximum pressure, the pressure which has been measured by the pressure transducer 3 only changing when the pressure in the volume A and thus also in the flow path 7 continues to increase. If the pressure in the volume A decreases so that it is less than the pressure in the flow path 7 downstream of the nonreturn valve 5, then the nonreturn valve 5 blocks the flow path 7 and the pressure measured by the pressure transducer 3 remains constant at the pressure maximum which was measured last.

In order to be able to take a new measurement, in a first step the shutoff valve 6 is closed. In this way, the flow path 7 downstream of the shutoff valve 6 is blocked, the pressure furthermore remaining constant at the pressure maximum which was measured last. If at this point the further shutoff valve 9 is opened, the medium located in the flow path 7 can flow out through the branch 8. In the flow path 7, ambient pressure which is also being measured by the pressure transducer 3 then prevails so that it no longer measures the previous maximum value. Then, the two valves 6 and 9 are actuated in the reverse sequence, specifically first the shutoff valve 9 in the branch 8 is closed and then the shutoff valve 6 in the flow path 7 is opened again. In this way, the flow path 7 is opened again and the medium can flow from the volume 4 in the membrane compressor 2 to the pressure transducer 3, as a result of which the pressure which has been measured by the pressure transducer 3 increases when the pressure rises in the volume 4.

Figure 2:
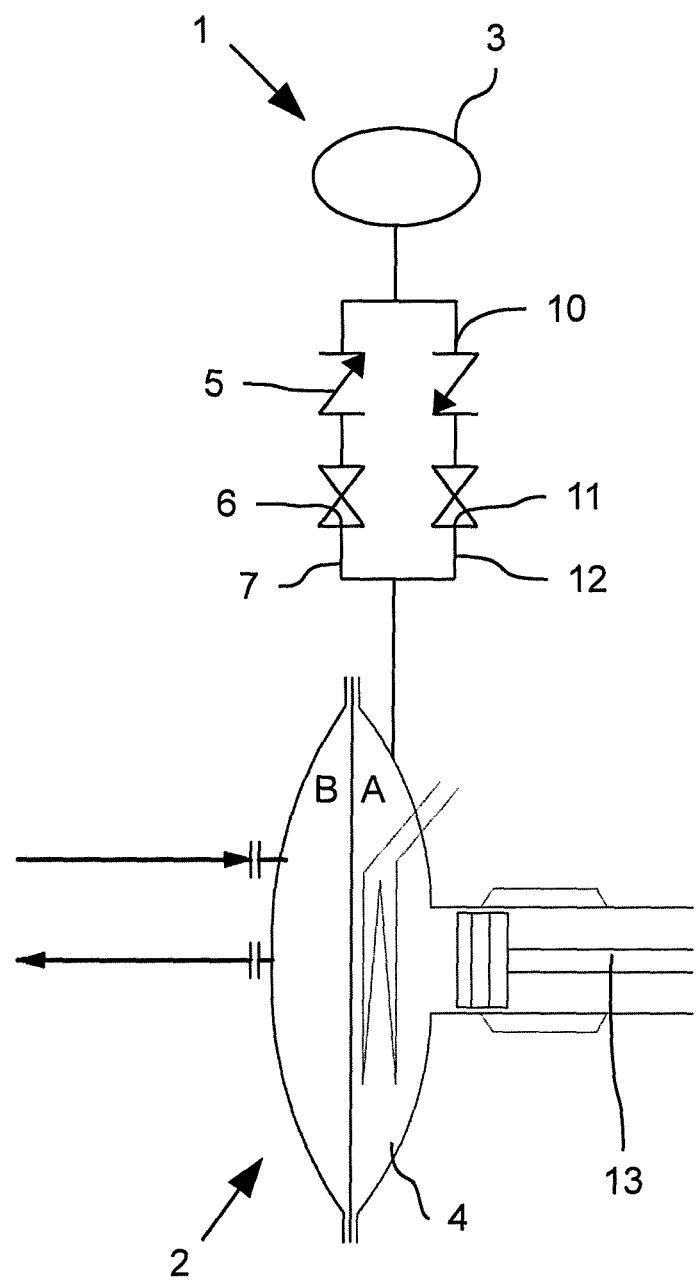
FIG. 2 shows a schematic of a first exemplary embodiment of a pressure monitoring apparatus in accordance with the invention.

FIG. 2 shows a first exemplary embodiment of a pressure monitoring apparatus 1 in accordance with the invention. Similarly to the pressure monitoring apparatus 1 which is shown in FIG. 1 and which is known from the prior art, a pressure transducer 3 is connected to the volume 4, specifically the oil side A, of a membrane compressor 2. In a first flow path 7, there are a nonreturn valve 5 and a shutoff valve 6, the shutoff valve 6 blocking in the flow direction from the pressure transducer 3 to the volume 4 so that the maximum pressure can be measured with the pressure transducer 3. In addition, in the pressure monitoring apparatus 1 shown in FIG. 2 there are another nonreturn valve 10 and another shutoff valve 11 in a second flow path 12 which is parallel to the first flow path 7, The nonreturn valve 10 in the second flow path 12 is located anti-parallel to the nonreturn valve 5 in the first flow path 7 so that the nonreturn valve 10 blocks in the flow direction from the volume 4 to the pressure transducer 3.

The shutoff valves 6 and 11 are used to block the flow paths 7 and 12 so that one flow path 7 or 12 at a time is always open. If the first flow path 7 is opened, medium can flow from the volume 4 to the pressure transducer 3, as a result of which the pressure transducer 3 can measure the maximum pressure in the volume 4 since the medium downstream of the nonreturn valve 5 cannot flow back through the flow path 7 in the direction of the volume 3. This path is blocked by the nonreturn valve 5. If the second flow path 12 is opened, while the first flow path 7 is blocked by the shutoff valve 6, medium can flow back from the pressure transducer 3 to the volume 4 as long as the pressure in the volume 4 is less than the pressure prevailing on the pressure transducer 3 above the nonreturn valve 10. In this way, the pressure in the flow path 12 can decrease when the pressure in the volume 4 decreases. When the pressure in the volume 4 has reached its minimum, this pressure is measured by the pressure transducer 3. If the pressure in the volume 4 rises again due to the oscillating movement of the membrane compressor 2, the nonreturn valve 10 blocks the flow path 12 and the pressure measured by the pressure transducer 3 downstream of the nonreturn valve 10 remains constant at the minimum value which was measured last.

In this way, both the maximum pressure and also the minimum pressure which depending on the position of the piston 13 of the membrane compressor 2 prevails in the volume 4 can be measured by alternating actuation of the two shutoff valves 6, 11. Continuous measurement of the pressure in the volume 4 is not necessary since the respective maximum value or minimum value prevails on the pressure transducer 3 due to the two nonreturn valves 5, 10. The values measured by the pressure transducer 3 only change when the maximum value which was measured last has been exceeded or the minimum value which was measured last has been undershot, and thus, a new maximum value or a new minimum value is recorded. The two nonreturn valves 5, 10 thus act as a type of peak value storage.

Figure 3:
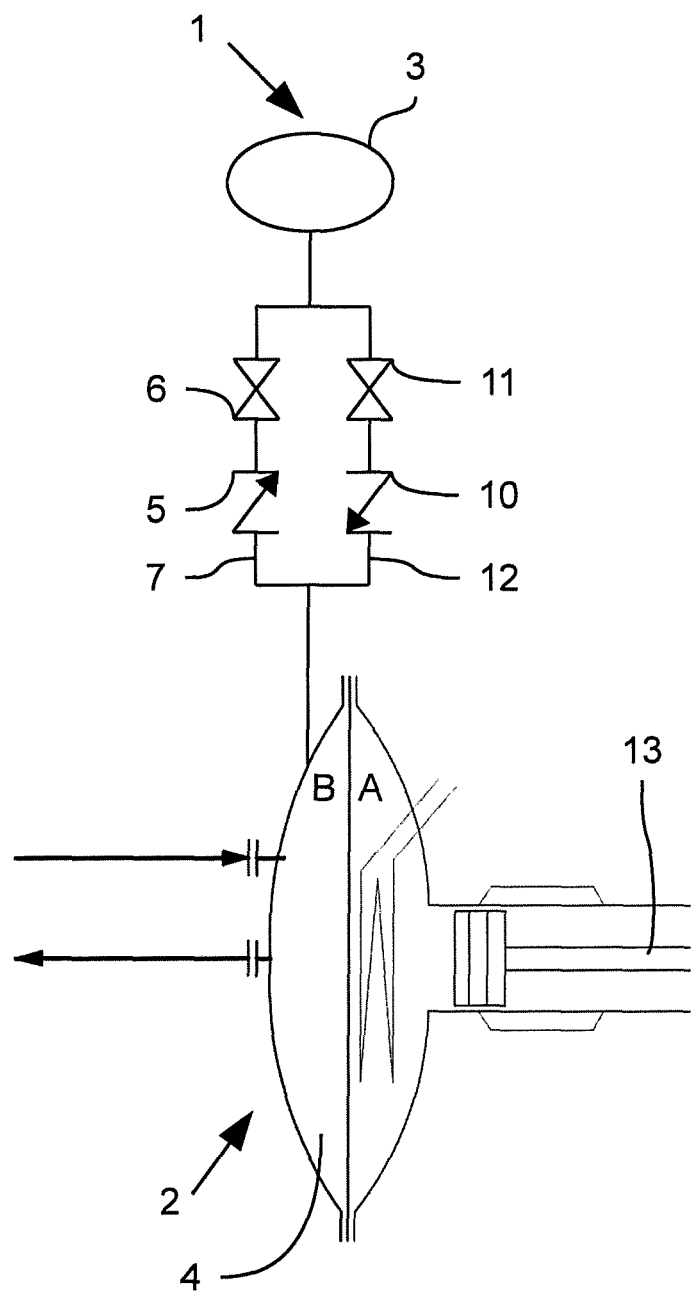
FIG. 3 shows a schematic of another exemplary embodiment of a pressure monitoring apparatus in accordance with the invention.

FIG. 3 shows one exemplary embodiment of a pressure monitoring apparatus 1 similarly to the pressure monitoring apparatus 1 shown in FIG. 2. In this case however, the pressure is measured not on the oil side A, but on the gas side B. Moreover, the nonreturn valves 5, 10 are located upstream of the shutoff valves 6, 11 in the direction from the volume 4, therefore the gas side B of the membrane compressor 2, to the pressure transducer 3. The valves can be located in the respective flow paths 7, 12 in any sequence relative to one another as long as the individual flow paths 7, 12 can be blocked independently of one another.

Figure 4:
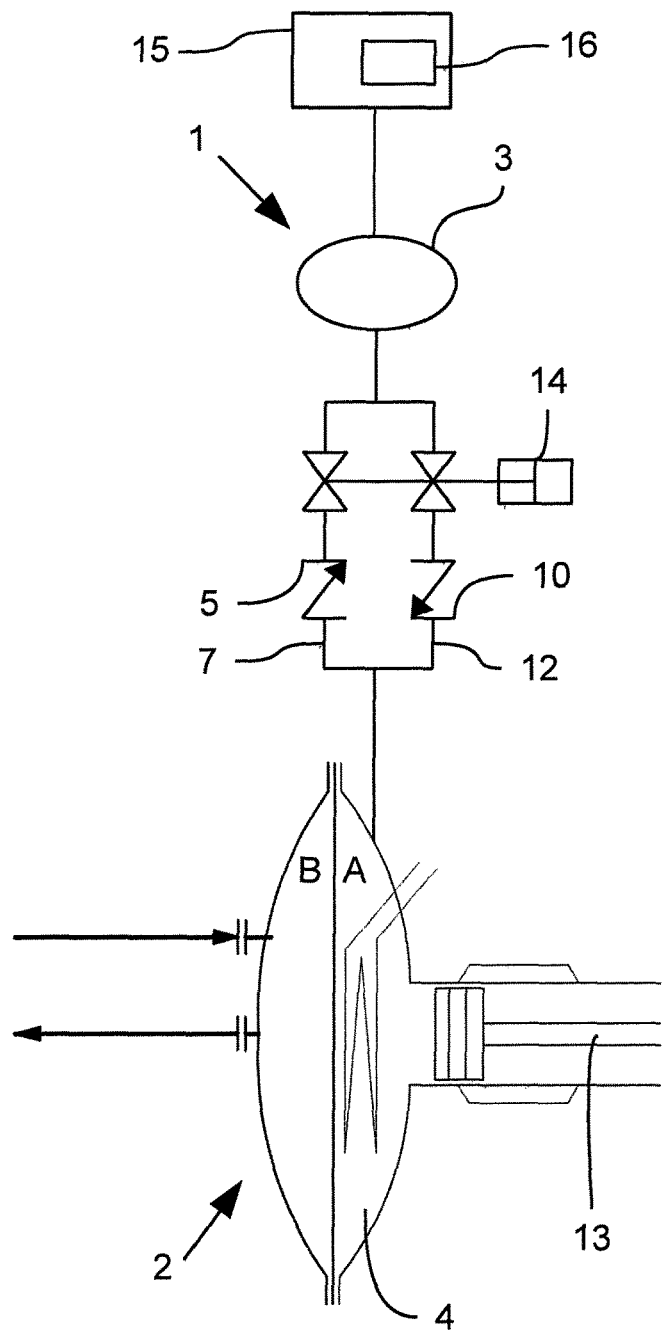
FIG. 4 shows a schematic of an exemplary embodiment of a pressure monitoring apparatus with a 3/2 way valve in accordance with the invention.

FIG. 4 shows a similar exemplary embodiment of a pressure monitoring apparatus 1 similar to the pressure monitoring apparatus 1 shown in FIG. 3, but like the FIG. 2 embodiment, the pressure transducer 3 here measures the pressure in the volume 4 on the oil side A of the membrane compressor 2. Instead of the two separate shutoff valves 6 and 11, in the pressure monitoring apparatus 1, a 3/2 way valve 14 is used by which the two flow paths 7, 12 can be reciprocally blocked and opened. In this way, the size of the pressure monitoring apparatus 1 can be reduced. Moreover, a programmable control 15 can be connected to the pressure transducer 3. In this way, the sequence of the measurement of the pressure and of the maximum and the minimum pressure can be automated. In particular, in this way, the intervals in which the 3/2 way valve is switched over can be changed or set. Furthermore a pressure display apparatus 16, for example a display, can be connected to the pressure transducer 3, so that the current pressure value can be easily read off on site.

Figure 5:
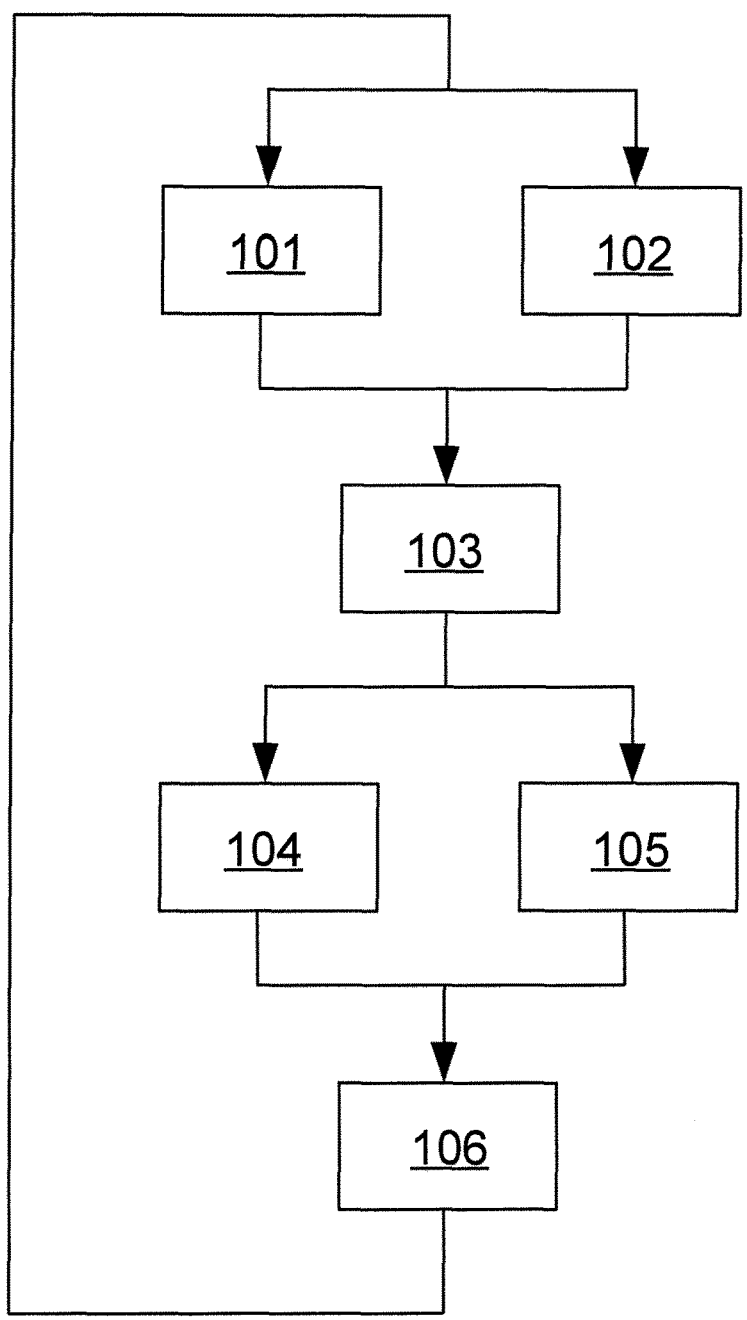
FIG. 5 shows a simplified representation of the sequence of a measurement of the maximum and of the minimum pressure in accordance with the method of the invention.

FIG. 5 shows a simplified representation of the sequence of a measurement of the minimum and of the maximum pressure with a pressure monitoring apparatus according to FIG. 2. In step 101, the shutoff valve 6 is opened and in step 102 the shutoff valve 11 is closed. In this way, the first flow path 7 is opened so that, in step 103, the pressure transducer 3 measures the pressure in the volume 4 which ultimately corresponds to the maximum pressure which prevails in the volume 4. The measurement can be taken essentially over any time interval, but a measurement in the range of a few seconds being preferred. In step 104, the shutoff valve 6 is closed, as a result of which the flow path 6 is blocked and in step 105 the shutoff valve 11 is opened so that the flow path 12 is cleared. In this way, in step 106, the minimum pressure can be measured with the pressure transducer 3 when the pressure in the volume 4 is reduced again.

In any time intervals, steps 101 to 106 can be repeated. When a measurement is automated by a programmable control 15, other functions can be introduced. Thus, for certain boundary values of the maximum pressure or of the minimum pressure, warnings can be output or when the boundary values are exceeded or undershot and the intervals 103 and 106 in which the measurements are taken can be shortened or prolonged. In this way, it is possible to react to changes of the pressure which are measured by the pressure transducer 3 in the monitored volume 4 which do not correspond to the expected pressure characteristic, as a result of which a defect can be recognized in time.

What is claimed is:

1. A pressure monitoring apparatus, comprising:
   at least one pressure transducer for recording the pressure within a volume to be monitored,
   at least two nonreturn valves and
   at least two shutoff valves for blocking of the at least two nonreturn valves, each nonreturn valve and shutoff valve being located in a respective flow path through which a medium can flow between the volume to be monitored and the pressure transducer,
   wherein the at least two nonreturn valves are in an anti-parallel configuration with respect to each other,
   wherein a first of the at least two nonreturn valves blocks flow in a flow direction from the volume to be monitored to the pressure transducer and a second of the at least two nonreturn valves blocks flow in a flow direction from the pressure transducer to the volume to be monitored.

2. The pressure monitoring apparatus as claimed in claim 1, wherein the shutoff valves are each located in the flow direction from the volume to be monitored to the pressure transducer upstream of the respective one of the nonreturn valves.

3. The pressure monitoring apparatus as claimed in claim 1, wherein the shutoff valves are each located in the flow direction from the volume to be monitored to the pressure transducer downstream of the respective one of the nonreturn valves.

4. The pressure monitoring apparatus as claimed in claim 1, wherein the shutoff valves comprise a 3/2 way valve.

5. The pressure monitoring apparatus as claimed in claim 1, further comprising a pressure display apparatus which displays values which have been measured by the pressure transducer.

6. The pressure monitoring apparatus as claimed in claim 1, further comprising a programmable control for at least one of control and adjustment of the pressure monitoring apparatus.

7. A process for operating a compressor with a pressure monitoring apparatus having at least one pressure transducer for recording the pressure within a volume to be monitored, at least two nonreturn valves and at least two shutoff valves for blocking of the at least two nonreturn valves, each nonreturn valve and shutoff valve being located in a respective flow path through which a medium can flow between a volume to be monitored and the pressure transducer, the at least two nonreturn valves being in an anti-parallel configuration with respect to each other, the process, comprising
    activating the at least two shutoff valves in defined intervals, one shutoff valve being opened and the other shutoff valve being blocked so that a maximum pressure in the volume being monitored is detected by the pressure transducer in the flow direction from the volume to the pressure transducer and a minimum pressure is detected by the pressure transducer in the flow direction from the pressure transducer to the volume being monitored.

8. The process as claimed in claim 7, wherein when a defined respective boundary value of the maximum pressure is exceeded or undershot at least one of an optical signal and an acoustic signal is output.

9. The process as claimed in claim 7, wherein when a defined respective boundary value of the minimum pressure is exceeded or undershot at least one of an optical signal and an acoustic signal is output.

10. The process as claimed in claim 7, comprising the further step of determining a characteristic of acquired values of at least one of the maximum pressure and the minimum pressure.

11. The process as claimed in claim 10, further comprising adjusting defined intervals in which the shutoff valves are each opened and blocked in response to a deviation of stipulated pressure characteristics of at least one of the maximum pressure and the minimum pressure.

12. The process as claimed in claim 7, wherein values which have been measured by the pressure transducer are processed in a process control system.

* * * * *